Patented Mar. 19, 1946

2,397,008

UNITED STATES PATENT OFFICE 2,397,008

ESTERS OF 12-HYDROXYSTEARIC ACID

Melvin J. Hunter and Howard N. Fenn, Midland, Mich., assignors to The Dow Chemical Company, Midland, Mich., a corporation of Michigan No Drawing. Application October 24, 1942, Serial No. 463,252

5 Claims. (Cl. 260—410.9)

This invention relates to certain new esters of 12-hydroxystearic acid having the formula:

wherein R represents a hydrocarbon radical containing from 7 to 14 carbon atoms inclusive and selected from the group consisting of alkyl, aralkyl, and substituted cycloalkyl radicals. These new esters are particularly effective as mold release agents when used in small amounts in thermoplastic molding compositions. They are also useful as raw materials in the preparation of emulsifying agents.

These new compounds may be prepared by esterifying 12-hydroxystearic acid with a monohydric alcohol having the formula ROH, wherein R represents a hydrocarbon radical containing from 7 to 14 carbon atoms inclusive and selected from the group consisting of alkyl, aralkyl, and substituted cycloalkyl radicals. Anhydrous hydrogen chloride may conveniently be used to catalyze the reaction, and the reaction mixture may be fractionally distilled under reduced pressure to recover the ester. An excess of the alcohol may advantageously be employed as a reaction solvent.

In one modification of the process the 12-hydroxy-stearic acid is dissolved in the alcohol and anhydrous hydrogen chloride gas passed into the mixture. The mixture containing the anhydrous hydrogen chloride is allowed to react until the esterification is partially complete, and the mixture is then heated under reduced pressure to vaporize the water formed during the esterification. The residual mixture is then cooled and an additional quantity of anhydrous hydrogen chloride is added and the process repeated until the desired degree of esterification has taken place. Alternatively, the esterification may be carried out by prolonged heating of a mixture of 12-hydroxystearic acid and the alcohol under a slow stream of carbon dioxide.

Other ways in which the foregoing esters may be prepared include (1) the catalytic hydrogenation of the corresponding esters of ricinoleic acid, (2) the reaction of a salt of 12-hydroxystearic acid with a halohydrocarbon, and (3) the alcoholysis of the glyceryl ester of 12-hydroxy-stearic acid.

The esters of the present invention are oils or crystalline solids melting, usually, below 100° C. They are substantially insoluble in water but may be crystallized from solvents such as petroleum ether, alcohol, benzene, toluene, ether, carbon tetrachloride, etc. The esters may be fractionally distilled under reduced pressure.

Among the esters of 12-hydroxystearic acid contemplated by the present invention may be mentioned the straight and branched chain alkyl esters such as heptyl, n-octyl, nonyl, decyl, lauryl and 2-ethyl-hexyl, the substituted cycloalkyl esters, such as 2-methyl-cyclohexyl, 4-methylcyclohexyl, ethyl-cyclohexyl and benzyl-cyclohexyl and the aralkyl esters, such as alpha-phenylethyl, naphthyl-ethyl and beta-phenyl-ethyl.

One preferred embodiment of the invention resides in the ester product which results when the crude 12-hydroxy-stearic acid obtained by the hydrolysis of hydrogenated castor oil is esterified. Such crude acid usually contains about 86 per cent by weight of 12-hydroxystearic acid, the balance consisting principally of other saturated acids containing 18 carbon atoms, such as stearic acid, dihydroxy-stearic acid, etc. The ester product obtained by esterifying the crude 12-hydroxystearic acid contains, in addition to the ester of 12-hydroxystearic acid, the esters of these other acids. This mixture is, for many purposes, of satisfactory quality and may be used without separating the ester of the 12-hydroxystearic acid in highly purified form, although such separation may, if desired, be effected readily by fractional distillation or by crystallization.

It should be mentioned that the ester product of the preferred embodiment of the invention just described may be obtained by methods other than by the esterification of crude 12-hydroxystearic acid. For example, the mixture of acids obtained by hydrolysis of castor oil consisting largely of ricinoleic acid may be esterified to produce a ricinoleic acid ester product and the latter then hydrogenated. The hydrogenated ester product corresponds very closely in composition and properties to that obtained by the esterification of the mixture of acids obtained by the hydrolysis of hydrogenated castor oil.

The following examples describe the preparation of certain representative members of the new group of compounds but are not to be construed as limiting the invention:

Example 1

4000 grams of 12-hydroxystearic acid of about 86 per cent purity, obtained by hydrolyzing hydrogenated castor oil, and 4000 grams of 2-ethylhexanol were warmed together until the 12-hydroxystearic acid had all dissolved and a rapid stream of dry hydrogen chloride gas was passed into the mixture at about 30° to 40° C. for about 10 minutes. The stream of hydrogen chloride gas was stopped, and the mixture was then heated for approximately one hour at 85° to 90° C. under a pressure of from 2 to 5 centimeters of mercury. During the heating the water which was formed during the esterification process, together with most of the hydrogen chloride which had been added, was vaporized. The pressure was then raised to atmospheric and dry hydrogen chloride gas again passed in for 10 minutes at about 30° to 40° C. The alternate addition of hydrogen chloride and vaporization of water under reduced pressure was repeated three times. The oily reaction product was transferred to a glass still and the unreacted 2-ethyl-hexanol removed by distillation under reduced pressure at 150° to 200° C. The recovered 2-ethyl-hexanol weighed 2,345 grams. The crude ester was then fractionally distilled with reflux under a pressure of from 0.3 to 0.5 millimeter of mercury, and the fraction distilling at 220° to 250° C. was collected separately. There were thus obtained 4201 grams of a product consisting largely of 2-ethyl-hexyl 12-hydroxystearate together with some 2-ethyl-hexyl stearate. The undistilled and somewhat tarry residue remaining in the still weighed 793 grams and probably consisted largely of inter-esters of 12-hydroxystearic acid. The distillate was refractionated under reduced pressure and there was thus obtained pure 2-ethyl-hexyl 12-hydroxystearate having a melting point of 19° to 19.5° C., a specific gravity of 0.8870 at 25/20° C., and a refractive index of 1.4540 at 25° C.

*Example 2*

4500 grams of a mixture of acids obtained by hydrolyzing castor oil and 4500 grams of 2-ethyl-hexanol were heated together for 18 hours at 185° to 200° C. under a slow stream of carbon dioxide. The unreacted 2-ethyl-hexanol was removed by distillation under reduced pressure and the 2-ethyl-hexyl ricinoleate was fractionally distilled under high vacuum. There were thus obtained 4265 grams of purified 2-ethyl-hexyl ricinoleate having a refractive index of 1.4542 and boiling at 220° to 250° C. at a pressure of from 0.1 to 0.2 millimeter of mercury. The distilled ester was placed in a hydrogenation vessel together with 100 grams of a nickel catalyst similar to that described in U. S. Patent 1,628,190. Hydrogen under a pressure of 150 pounds per square inch was admitted to the reaction vessel and the mixture was heated to 140° C. until absorption of hydrogen substantially ceased. The pressure was then released, and the reduced ester was cooled somewhat and filtered to remove the catalyst. The filtrate consisted of 2-ethyl-hexyl 12-hydroxystearate having substantially the same properties as those of the product of Example 1.

*Example 3*

2000 grams of 12-hydroxystearic acid similar to that used in Example 1 were esterified with 2000 grams of methyl-cyclohexanol substantially as by the method described in Example 1. The reaction product was fractionally distilled at a pressure of 0.5 millimeter of mercury and the fraction distilling at 220° to 230° C. was collected. The fraction weighed 1630 grams and consisted of substantially pure methyl-cyclohexyl 12-hydroxystearate. 695 grams of residue remained in the still.

*Example 4*

150 grams of 12-hydroxystearic acid were melted on the steam bath and 98 grams of benzyl alcohol added. Anhydrous hydrogen chloride was passed into the mixture for about 15 minutes and the water formed during the esterification was then removed, together with a portion of the benzyl alcohol and most of the hydrogen chloride, by heating the reaction mixture under reduced pressure. 10 grams of benzyl alcohol were added and anhydrous hydrogen chloride again passed into the mixture. The cycle was repeated three times after which no further water distilled from the heated mixture. The crude benzyl ester was washed with aqueous sodium bicarbonate and then with water and finally crystallized at a low temperature from 4 times its volume of low-boiling naphtha. The crystallized benzyl 12-hydroxystearate melted at 48° to 50° C.

*Example 5*

The melting point, specific gravity, and refractive index of a number of representative esters of 12-hydroxy-stearic acid from among those contemplated by the invention are listed in the accompanying table:

| Ester of 12-hydroxy stearic acid | Melting point, °C. | Specific gravity referred to water at 20° C. | Refractive index |
|---|---|---|---|
| 2-ethyl hexyl | 19–19.5 | 0.8870 at 25/20° C. | 1.4540 at 25° C. |
| n-Octyl | 28–33 | 0.8590 at 60/20° C. | 1.4440 at 60° C. |
| Lauryl | 53–54 | 0.8559 at 60/20° C. | 1.4452 at 60° C. |
| Methyl-cyclohexyl | 24–26 | 0.8881 at 60/20° C. | 1.4510 at 60° C. |
| Benzyl | 48–50 | 0.9595 at 60/20° C. | 1.4735 at 60° C. |
| Beta-phenyl ethyl | 54–56 | 0.9281 at 60/20° C. | 1.4702 at 60° C. |

Certain of the compounds described in the foregoing examples have been sulfated and found to yield products which are useful as emulsifiers. For example, equimolecular quantities of 2-ethyl-hexyl 12-hydroxystearate obtained as in Example 1, but without the final fractional distillation, and of ordinary concentrated sulfuric acid were mixed gradually with cooling and allowed to stand over night at ordinary room temperature. The resulting sulfated product was found to be substantially completely soluble in water. 10 grams of the sulfated ester were agitated thoroughly with a mixture of 40 grams of water and 40 grams of a purified mineral oil boiling over a range somewhat above that of kerosene. The mixture formed a stable emulsion which showed no signs of breaking after three hours standing and which could be diluted with a large volume of water to form a stable dilute emulsion. A similar emulsion prepared using a similarly sulfated methyl 12-hydroxystearate began to break after standing for from 3 to 5 minutes and upon dilution with water separated almost immediately into an oily and an aqueous layer.

We claim:

1. A compound having the formula $CH_3(CH_2)_5CHOH(CH_2)_{10}COOR$ wherein R represents an alkyl radical containing from 7 to 14 carbon atoms inclusive.

2. A compound having the formula:

$CH_3(CH_2)_5CHOH(CH_2)_{10}COOR$ wherein R represents an alkyl radical containing 8 carbon atoms.

3. 2-ethyl-hexyl 12-hydroxystearate.
4. n-Octyl 12-hydroxystearate.
5. Lauryl 12-hydroxystearate.

MELVIN J. HUNTER.
HOWARD N. FENN.